United States Patent [19]

Kirshenbaum et al.

[11] Patent Number: 4,609,721

[45] Date of Patent: Sep. 2, 1986

[54] PROCESS FOR MAKING MOLDING GRADE POLYETHYLENE TEREPHTHALATE

[75] Inventors: Gerald S. Kirshenbaum, Fanwood; Michael Goldin, Lawrenceville, both of N.J.; W. Alan Case, Charlotte, N.C.

[73] Assignee: Celanese Corporation, New York, N.Y.

[21] Appl. No.: 747,211

[22] Filed: Jun. 21, 1985

[51] Int. Cl.[4] .................. C08G 63/04; C08G 63/34
[52] U.S. Cl. .................... 528/285; 528/272; 528/308.2; 528/308.3; 528/483
[58] Field of Search ............ 528/272, 285, 308.2, 528/308.3, 483

[56] References Cited

U.S. PATENT DOCUMENTS

| | | | |
|---|---|---|---|
| 4,263,425 | 4/1981 | Rothe et al. | 528/308.2 |
| 4,271,287 | 6/1981 | Shah | 528/272 |
| 4,385,089 | 5/1983 | Bonnebat et al. | 428/35 |
| 4,387,213 | 6/1983 | Horlbeck et al. | 525/437 |
| 4,476,170 | 10/1984 | Jabarin | 528/308.2 X |

Primary Examiner—Lucille M. Phynes
Attorney, Agent, or Firm—Robert J. Blanke

[57] ABSTRACT

Polyethylene terephthalate (PET) produced by direct esterification of a mixture containing ethylene glycol and terephthalic acid in a mole ratio ranging from about 1.05 to about 1.35 dl/g, with at least about 325 parts of an antimony catalyst per million parts of polymer product, can be treated to reduce its acetaldehyde content and acetaldehyde generation rate and increase molecular weight to the levels required for the production of beverage bottles. After heat treatment to produce a crystallinity of at least about 10 percent, the PET can be used in molding after substantially conventional pre-drying and drying steps in air at the molding facility. The invention thus allows beverage bottle grade PET to be produced and prepared for molding without the conventional step of solid state polymerization or stabilization, saving energy, time, production costs and capital investment.

Also disclosed is a process for molding a PET preform wherein the polymer prepared as described above is melted, formed into the desired preform shape, and solidified by cooling. This preform can then be reheated above its glass transition temperature and molded into the desired container shape.

15 Claims, No Drawings

PROCESS FOR MAKING MOLDING GRADE POLYETHYLENE TEREPHTHALATE

BACKGROUND OF THE INVENTION

This invention relates to an improvement in making polyethylene terephthalate useful in molding containers such as bottles. More specifically, this invention relates to an improved process for producing polyethylene terephthalate which is good for making bottles for carbonated beverages.

The hazards of using glass containers for beer or carbonated beverages are well known. Dangerous breakage often takes place due to the internal pressure exerted by the pressurized gas in the bottles as well as by dropping or otherwise impacting the bottles, not only in the course of production and distribution of the bottled product, but also in handling of the bottled product by consumers.

Recently, the carbonated beverage industry has begun to use plastic, rather than glass, bottles for their beverages. Besides avoiding the hazards of breakage, plastic bottles also have the advantage of being much lighter than glass. Furthermore, less energy is required to make and transport plastic bottles.

Polyethylene terephthalate (hereinafter "PET") is a polymer which is particularly well suited for such applications. PET may be prepared, as is well known, by the esterification of ethylene glycol and terephthalic acid or by the ester interchange of dimethyl terephthalate with ethylene glycol, followed by condensation polymerization in the presence of a catalyst such as antimony trioxide, e.g., at a temperature of about 285° C. and at an absolute pressur of about 1 millimeter of mercury. The PET product may then be extruded and pelletized. Unfortunately, these PET pellets cannot be used directly in the preparation of carbonated beverage bottles, because excessively large amounts of acetaldehyde are produced in the pellets under the conditions by which they are normally made. Furthermore, even if all of this residual acetaldehyde were removed from the PET pellets, it has been found that additional acetaldehyde is generated when a preform is molded from the PET, the molding occurring at temperatures generally above 250° C. The presence of acetaldehyde usually affects the taste of any carbonated beverage, but particularly a cola flavored beverage which might be placed in such a container.

Accordingly, a commercially acceptable PET bottle must be prepared from PET which has only insignificant amounts of acetaldehyde present and which furthermore does not generate significant additional amounts of acetaldehyde when heated for molding into a container or bottle. Stringent standards are imposed by molders producing beverage bottles. In addition, the PET which is used in making such containers should have a suitably high intrinsic viscosity, i.e., above about 0.60, preferably 0.65 to 0.07, deciliters per gram as calculated from measurements made on an eight percent solution in o-chlorophenol at 25° C.

DESCRIPTION OF THE PRIOR ART

It is known that the intrinsic viscosity of melt polymerized PET may be increased by solid state polymerization in the presence of an inert gas such as nitrogen; see, e.g., U.S. Pat. No. 4,064,112. The use of such inert gas in solid state polymerization processes has generally been considered undesirable, however, because of cost.

The search has continued for improved processes for reducing acetaldehyde concentration in PET as well as for improved solid state polymerization wherein the intrinsic viscosity of PET is increased. For example, U.S. Pat. No. 4,223,128 (Halek et al) discloses a process and apparatus for preparing PET which comprises a step of solid state polymerization or stabilization of the PET by heating it for a period of hours in a countercurrent of air in a vertical column. Due to the high energy costs, as well as the capital investment in the equipment required in such a process, the search has continued for simpler, less costly methods of preparing PET resin which meets the standards for the molding of beverage bottles without requiring a costly solid state polymerization step as part of the resin manufacturing process.

Rothe et al disclose in U.S. Pat. No. 4,263,425 a heat treatment process for polyethylene terephthalate produced by an ester interchange process wherein PET chip having an intrinsic viscosity of about 0.5–0.85 is heated in an inert gas atmosphere at a temperature of 180° C.–230° C. for about 4 to 12 hours to reduce the acetaldehyde content to less than 2.5 parts per million and make the PET otherwise suitable for packing of food and beverages for human consumption. During this heating, the PET must not include more than 25 parts per million of ester interchange catalyst or 20 parts per million of phosphorus. Antimony catalysts for polycondensation are not mentioned.

Cholod et al disclose in U.S. Pat. No. 4,356,299 a polyethylene terephthalate polycondensation catalyst system which can be employed with PET prepared by direct esterification wherein about 1.8 to about 2.2 moles ethylene glycol are used per mole of terephthalic acid. The catalyst system comprises about 2–18 parts by weight of an alkyl titanate and about 40–300 parts by weight of an antimony compound, each being per million parts by weight of polymer product. The molecular weight of the resultant resin may be increased by heating the resin above its glass transition temperature but below its melting point in an inert gas or under reduced pressure for about 8 to 14 hours at a temperature of about 200° C.–235° C. Neither the acetaldehyde content nor the generation rate of acetaldehyde are mentioned, and it is not apparent whether the resin produced is suitable for molding beverage bottles.

Bonnebat et al disclose in U.S. Pat. No. 4,340,721 a process for preparing PET having an intrinsic viscosity ranging from 0.65 to 1.05 dl/g, and a residual acetaldehyde concentration of less than 1.25 ppm, with acetaldehyde being reformed therefrom at a rate of less than 5 ppm/hr at 220° C. The process involves subjecting PET prepolymer to drying and crystallizing, then a post-condensation in either the solid or molten state to produce the final desired intrinsic viscosity and other properties.

The post-condensation is preferably carried out in the solid state, under a high vacuum or under an inert gas, at between 190° C. and 230° C., for about 5 to 25 hours. The polycondensation is carried out in the presence of at least one comonomeric crystallization retardant. Antimony compounds can be used as polycondensation catalysts at concentrations below 200 parts by weight per million parts by weight of all constituents. The preparation of PET resin containing at least about 325 parts antimony catalyst per million parts reactants which is suitable for beverage bottle making after light crystallization and air drying is not disclosed.

Jabarin discloses in U.S. Pat. No. 4,154,920 a method for producing PET resins suitable for fabrication into carbonated beverage containers by rapidly polymerizing a prepolymer from an intrinsic viscosity of about 0.2 to an intrinsic viscosity of at least about 0.7. An antimony catalyst can be used at the polycondensation stage. The final polymerization stage is conducted in the solid state at a temperature in the range of about 200° C. to 240° C.

Duh discloses in U.S. Pat. No. 4,238,593 a two-stage process for the production of high molecular weight PET comprising a solid state polymerization step in a static or fluid bed wherein the intrinsic viscosity of the polycondensed polymer reaches at least 0.70 dl/g. An antimony catalyst can be used. Prior to solid state polymerization the prepolymer particles are crystallized and dried.

Hauenstein et al disclose in U.S. Pat. No. 4,230,819 a process for the removal of acetaldehyde from crystalline polyethylene terephthalate granules by passing a dry inert gas through a bed of resin at a temperature of 170° C. to 250° C. in an amount sufficient to remove acetaldehyde and other degradation products. An antimony catalyst can be used in a polymerization step for the PET resin.

Taubinger et al disclose in U.S. Pat. No. 4,133,800 a process for preparing polyesters such as PET by direct esterification wherein an antimony catalyst can be used in the polycondensation step as from 10 to 1000 parts by weight per million parts by weight of the dicarboxylic acid originally used. The residual content of acetaldehyde or generation rate of acetaldehyde are not mentioned.

Berkau discloses in U.S. Pat. No. 3,749,696 a process for the production of ultra-high molecular weight PET wherein prepolymers of PET are trans-esterified in the presence of complementary catalytic amounts of antimony and alkali metal salts.

OBJECTS OF THE INVENTION

Accordingly, a general object of the present invention is to avoid or substantially alleviate the above problems of the prior art.

A more specific object of the invention is to provide a process for reducing the acetaldehyde level of PET which is intended for use in preparing PET containers such as carbonated beverage containers.

Another object of the invention is to provide a process for reducing the generation rate of acetaldehyde of PET which is intended for use in preparing PET containers such as carbonated beverage containers.

Still another object of the invention is to provide a process for increasing the intrinsic viscosity of PET which is intended for use in preparing PET containers.

Another object of the invention is to provide a process for reducing the acetaldehyde level and generation rate of acetaldehyde of PET and increasing its intrinsic viscosity without the need for time-consuming and costly steps such as solid state polymerization or stabilization in the production facility.

A more specific object of the invention is to provide such a process which produces PET suitable for molding bottles for cola drinks.

Still another object of the invention is to provide an improved integrated process for molding containers of PET polymers low in acetaldehyde.

These and other objects, as well as the scope, nature and utilization of the claimed invention, will be apparent to those skilled in the art from the following detailed description, examples and the appended claims.

Ratios or proportions of materials are given throughout this specification on a weight basis unless otherwise indicated.

SUMMARY OF THE INVENTION

A process has now been developed for the production of a beverage bottle-grade PET resin wherein a PET resin is prepared by melt polymerization under especially selected conditions which eliminate the need for a subsequent separate solid state polymerization step and which permit the molder to use typical air drying steps to upgrade the thus-produced PET chip for use in blow molding, thereby reducing the levels of moisture, acetaldehyde and acetaldehyde generation therein and increasing its intrinsic viscosity to a level advantageous for molding beverage bottles. These air drying conditions are typically at a lower temperature and of shorter duration than solid state polymerization conditions.

In accordance with the present invention, an improved process is provided for producing polyethylene terephthalate chip having levels of acetaldehyde content, acetaldehyde generation rate and intrinsic viscosity suitable for the molding of beverage containers after being subjected to substantially normal air drying steps at a molding plant, comprising the steps of:

(a) introducing ethylene glycol and terephthalic acid to a reactor in a ratio of about 1.05 to about 1.35 moles ethylene glycol per mole terephthalic acid and an antimony catalyst in a concentration in the range of from about 325 to about 600 parts antimony per million parts by weight of the product polymer, and heating the resulting mixture at a temperature in the range of from about 240° C. to about 260° C. and a pressure in the range of from about 1 to about 5 atmospheres until the acid is at least about 95 percent esterified to form an esterified monomer mixture;

(b) melt polymerizing the antimony-containing monomer mixture of step (a) by heating it in at least two stages at progressively higher temperatures in the range of about 270° C. to about 285° C. and at a reduced pressure until it becomes a molten polymer having an intrinsic viscosity of at least about 0.64 deciliters/gram;

(c) extruding the molten polymer of step (b) into a water bath for quenching, then pelletizing the quenched polymer so that its average individual chip volume is in the range of from about 2.3 to about 3.5 mm$^3$; and (d) crystallizing the polymer pellets by heating in air or an inert atmosphere with agitation at a temperature in the range of from about 110° C. to about 160° C. for a time effective to produce a degree of crystallinity in the polymer in the range from about 10 percent to less than about 30 percent.

In accordance with the present invention there is also provided a process wherein polyethylene terephthalate chip ready for molding into beverage containers is prepared by subjecting the crystallized polymer pellets of step (c) to typical drying steps at a molding facility comprising a pre-drying step for a time in the range of from about 1 to about 3 hours at a temperature in the range of from about 145° C. to about 165° C. using air having a dew point below about −40° C. flowing at a velocity of about 1 to 2 ft./sec., and then a drying step using similar low dew point air at a temperature in the range of from about 190° C. to about 210° C. for a time in the range of from about 2 to about 5 hours.

Further in accordance with the present invention, there is also provided an improved process for producing polyethylene terephthalate suitable for the molding of beverage containers, comprising the above steps (a) through (d) and at least one drying step preparatory to molding, wherein the conditions of these steps are preferably controlled to produce a molding resin having a level of residual acetaldehyde less than about 3 parts per million, a generation rate of acetaldehyde less than about 4 parts per million per minute, and an intrinsic viscosity of at least about 0.68 deciliters per gram as calculated from measurements made on an eight weight percent solution in o-chlorophenol at 25° C.

Still further, in another aspect of the present invention, there is also provided a process of molding a polyethylene terephthalate container, comprising the steps of melting a polymer produced by a process of the present invention, forming it into a desired shape and cooling the molten polymer. In a related aspect of the invention, articles molded by such a process are provided.

DESCRIPTION OF THE PREFERRED EMBODIMENTS

The terms "polyethylene terephthalate" and "PET" as used herein are used generally to include high-molecular weight polymers made by condensing ethylene glycol with terephthalic acid or dimethylterephthalate no matter how prepared. Furthermore, these terms are meant to include well-known polyethylene terephthalate polymers which are modified by the inclusion of minor amounts, e.g., less than about 20 percent by weight of the polymer, of comonomers or modifying agents, as is otherwise well known. Such comonomers or modifying agents include various diols such as 1,4-butanediol, cyclohexanedimethanol, diethylene glycol and/or 1,3-propanediol. Likewise, such comonomers or modifying agents can include various diacids such as isophthalic acid, adipic acid, 2,6-naphthalene dicarboxylic acid and p-hydroxy benzoic acid. Minor amounts of chain branching agents and/or chain terminating agents may also be used. Such chain branching agents include, for example, polyfunctional acids and/or polyfunctional alcohols such as trimethylol propane and pentaerythritol. Chain terminating agents include monofunctional alcohols and/or monofunctional carboxylic acids such as stearic acid and benzoic acid. Mixtures of the chain branching and chain terminating agents may also be used. PET which contains such chain branching agents and chain terminating agents is described in U.S. Pat. No. 4,161,579, the disclosure of which is hereby incorporated by reference.

Although the terms "polyethylene terephthalate" and "PET" are meant to include polyethylene terephthalate polymers containing minor amounts of modifying agents or chain branching agents, for purposes of illustration only, the remainder of this specification is generally directed to PET which does not contain such added modifying agents or chain branching agents.

The PET useful in the process of the present invention is prepared by a continuous polymerization process involving the esterification of mixtures comprising ethylene glycol, terephthalic acid and an antimony catalyst wherein the glycol is present in a relatively small excess, i.e. mixtures wherein the molar ratio of glycol with respect to the acid is in the range of from about 1.05 to about 1.35. Preferably, this ratio is maintained in the range of from about 1.15 to about 1.25. The mixture of glycol and acid is heated to a temperature in the range of from about 240° C. to about 260° C. at a pressure in the range of from about 1 to about 5 atmospheres, preferably at a temperature of about 245°–255° C. and a pressure of about 2–4 atmospheres, until the acid is at least 95 percent esterified to form an esterified monomer mixture. This monomer mixture is a flowable, pumpable material generally resembling a patching plaster, the viscosity varying with the mole ratio of the reactants. The monomer mixture contains a mixture of unreacted raw materials (i.e., terephthalic acid and ethylene glycol), unpolymerized ethylene terephthalate, and oligomers or low polymers having a degree of polymerization of up to about 6, with the average degree of polymerization in the range of from about 2 to about 3.

The antimony catalyst is added with the raw materials in an amount of at least about 325 parts by weight (based on elemental antimony) per million parts by weight of the expected polymer product. Any suitable form of antimony can be used, including elemental antimony, oxides, and either organic or inorganic compounds of antimony, such as antimony oxalate, antimony glucoxide, antimony butoxide, and acetyl antimony dibutoxide. Antimony trioxide, $Sb_2O_3$, is presently preferred because of general availability. The use of antimony catalyst in sufficient quantity is important, as the polymer may oxidize in subsequent drying steps if sufficient antimony is not present. Also, the polymer may not be stabilized nor attain the intrinsic viscosity desired for molding if sufficient antimony is not present. Antimony is preferably present as an amount in the range of from about 325 to about 600 parts by weight, or more preferably from about 350 to about 450 parts per million parts by weight of the polymer product, as can be readily determined by preliminary tests for any particular case. However, excessive antimony should be avoided because it can adversely affect the color of the polymer and cause depolymerization or rapid crystallization during molding.

The resulting monomer mixture of product and antimony is preferably heated at substantially atmospheric pressure at a temperature in the range of from about 260° C. to about 275° C. until the esterification of the acid is substantially complete.

The esterified mixture is then polymerized in at least two stages, e.g. in three stages: first, at a temperature in the range of from about 270° C. to about 280° C. at a reduced pressure of not more than 40 mm/Hg, second at the same temperature but a pressure of about 12 to about 15 mm/Hg wherein a stabilizer such as a phosphoric or polyphosphoric acid is added and the resulting melt is polymerized to an intrinsic viscosity in the range of about 0.25 to about 0.28 dl/g; and finally, the melt is further polymerized at a temperature of about 283° C.–285° C. and a pressure of about 1–3 mm/Hg until it attains an intrinsic viscosity of at least about 0.64 dl/g.

The PET reaction product may then be extruded at a temperature of about 285° C. and a pressure of about one atmosphere into water and allowed to solidify therein. The solid PET may then be pelletized by means known to those skilled in this art. For example, the PET may be pelletized using an underwater pelletizer.

The PET useful in the present invention may be in any form such as pellets, chips, or granules, preferably of relatively uniform size and shape. For ease of reference, the PET will hereinafter be referred to as "PET chip" but it is understood that the present invention is applicable to PET in any form and the term "PET chip" is meant to include PET in any form. Any shape PET pellets, chips or granules may be used in the present invention. For example, cubes, spheres or cylindrically shaped particles may be used, although cube or "dog-bone" shaped particles are preferred. Particles having shapes and sizes which maximize the ratio of surface area to volume are preferred.

The PET chip must not be too small or the particles will have a tendency to stick together somewhat and generate fines, which clog the system and constitute waste. They should not be too large, either, because the diffusion of acetaldehyde which takes place during drying at the molding facility would not proceed rapidly enough with particles which are too large because the diffusion rate is controlled by the particle thickness. The maximum average dimension of the side of the PET chips, if substantially cubic shaped chips were used, is about 1.5 mm. Preferably, cubes which are about 1.3 mm on a side are employed. In other terms, the PET chips can have an average volume in the range of from about 2.3 to about 3.5 mm$^3$, preferably in the range from about 2.5 to about 3 mm$^3$.

After the PET has been pelletized, the surface water on the PET is preferably removed by mechanical means such as by blowing air at ambient temperatures on the pellets or chips.

The PET prepared as described above has an intrinsic viscosity of generally from about 0.6 to about 0.7, typically from about 0.62 to about 0.68, and preferably from about 0.64 to about 0.67 deciliters per gram as calculated from measurements made on an 8 percent by weight solution in o-chlorophenol at 25° C.

The PET as thus produced has a residual acetaldehyde content (hereinafter "RAC") of generally at least about 20, typically at least about 30, and more likely at least about 45 parts per million parts of PET and a generation rate of acetaldehyde (hereinafter "GRA") of generally at least about 4, typically at least about 4.5, and more likely at least about 5 parts of acetaldehyde per million parts of PET per minute.

The residual acetaldehyde content of a sample of PET is determined by the standard GC solid method, which begins with grinding the sample to a fine powder under liquid nitrogen. This powder is then placed in a gas chromatograph, heated to 150° C., and the amount of liberated acetaldehyde is determined by comparing the peak produced to a standard. This may also be measured using an automated headspace GC method. Both tests are described further by Applicant Kirshenbaum, et al., in "The Importance of Low Acetaldehyde Level and Generation Rate in PET Resins," ORGANIC COATINGS and PLASTICS CHEMISTRY, Vol. 41, (Preprints of Papers Presented by Div. of Organic Coatings and Plastic Chemistry at American Chemical Society 178th National Meeting, Washington, D.C. Sept. 9–14, 1979) pages 324–329 (1979).

The GRA of a sample of PET may be measured by grinding the particular sample to a fine powder under liquid nitrogen, degassing the sample at 150° C. for 20 minutes in a nitrogen stream to remove any contained acetaldehyde, holding the sample in the injection port of a gas chromatograph at 280° C.±0.5° C. for precisely 10 minutes and allowing the volatile materials to condense on a column which is at room temperature, separating the sample from the column after 10 minutes, heating the column at 150° C., and measuring the peaks from the gas chromatograph readout. The total amount of acetaldehyde that is liberated is determined by reference to a standard. This total amount, in parts per million, is then divided by the time (10 minutes) to give the number of parts of acetaldehyde per million of PET generated per minute.

Precise timing and temperature control is needed to ensure the precision of this GRA test. Furthermore, the injection port of the gas chromatograph should be designed to have the entire sample tube surrounded by a large thermal mass of material which is held at 280° C.±0.5° C. This large thermal mass ensures a rapid and reproducible heating of the entire sample to the test temperature. This GRA test assumes that there is no time lag between injection of the sample and arriving at the test temperature. This GRA test is described by Kirshenbaum, et al., supra, at page 328.

The GRA is temperature dependent. Throughout the instant specification and claims, disclosed values of GRA are all obtained at 280° C.

The difference between acetaldehyde level and GRA is that the acetaldehyde level represents the amount of free or dissolved acetaldehyde actually present in the PET pellets or chips at any particular time whereas the GRA represents the rate at which acetaldehyde may be generated when the PET pellets or chips are again heated at temperatures at which PET may be molded into plastic containers.

The amorphous PET prepared as described above has substantially no crystallinity, i.e., a crystallinity of generally less than 10, and typically from about 4 to about 8 percent. By "crystallinity" is meant the arrangement of polymer molecules in regular patterns that are relatively dense and cohesive. Thus, as the degree of crystallinity increases, the mobility of the individual polymer units becomes more limited, thereby providing rigidity and dimensional stability to the product, especially at temperatures above room temperature. The degree of crystallinity may be determined by X-ray crystallography or by other means known to those skilled in this art. In the instant specification, the degree of crystallinity is determined by density measurements. The density of PET having 0 percent crystallinity is determined and that having 100 percent crystallinity is calculated from the dimensions of the unit cell. Intermediate percentages of crystallinity are interpolated therefrom.

Amorphous PET can be directly stabilized by the process of U.S. Pat. No. 4,223,128 only with great difficulty, since the PET passes through a tacky stage (above its glass temperature) when it is being raised to the stabilization temperature, causing it to sinter if it is not sufficiently agitated. Furthermore, when the PET is heated at sufficiently high temperatures for sufficiently long time periods, it begins to crystallize. Since crystallization is an exothermic process, the heat of crystallization tends to enhance the tackiness and sintering tendency of the PET, and thus contributes to the need for agitation while the PET is crystallizing.

In order to avoid this sintering, U.S. Pat. No. 4,223,128 teaches that PET which is not sufficiently crystallized may be first crystallized at temperatures which may be higher or lower and for residence times which are preferably shorter than those used in the stabilization step. To obtain this objective, the crystallinity of the PET is to be increased to at least 30, and preferably to about 35 to 45 percent. If a continuous process comprising crystallization followed by stabilization is desired, and if a low air to chip ratio in the stabilization step is also desired, the temperature during the crystallization step should be as high as possible, preferably above about 190° C. Agitation of the PET allows the PET to crystallize without agglomerating.

In contrast to this requirement, the process of the present invention requires only light crystallization at this stage, i.e., at least about 10 percent, preferably in the range of from about 10 percent to less than about 30 percent, and most preferably from about 15 to about 25 percent, and the process is preferably carried out at a relatively low temperature, e.g., from about 110° C. to about 160° C., preferably from about 115° C. to about 125° C., so that energy requirements are minimized.

The PET must be agitated sufficiently so that it does not agglomerate or sinter during the crystallization step. Such agitation may be carried out by any means known to these skilled in this art, provided an atmosphere of air or an inert gas such as nitrogen is present. For example, the crystallization step may be carried out in a fluidized bed, or a stirred bed, or in a vessel that contains one or more rotating screws, or by any other means known to those skilled in this art. The PET must be kept in constant motion to prevent agglomeration or sintering.

The result of this crystallization step is to increase the crystallinity of the PET to generally at least about 10, and preferably from about 15 to about 25 percent. The purpose of this step is to prevent the PET chips from sticking together during the drying steps.

This crystallization step may be carried out at a temperature of generally from about 110° C. to about 160° C., typically from about 110° C. to about 140° C., and preferably from about 115° C. to about 125° C. for generally at least about 3, typically from about 4 to about 40, and preferably from about 5 to about 20, minutes. These time and temperature conditions apply for unmodified PET. For PET which contains minor amounts of modifying or chain branching agents, somewhat different ranges may be used after routine preliminary testing as would be apparent to those skilled in this art in view of this disclosure. The chip must attain a temperature in the range of from about 110° C. to about 120° C. to crystallize properly.

The degree of crystallization is determined by the maximum temperature at which crystallization is carried out. The extent to which this maximum degree of crystallinity is attained is directly dependent upon the time that the PET is kept at this temperature.

If a temperature less than about 110° C. or if a heating time of less than about 3 minutes at moderately higher temperatures is employed, there results insufficient crystallization in the PET such that significant agglomeration could take place when the PET is subsequently dried at temperatures above about 190° C.

This crystallization step generally results in a PET product which has a residual acetaldehyde level of generally less than about 20, typically less than about 15, and preferably less than about 10, parts of acetaldehyde per million parts of PET.

This PET has a moisture content of generally from about 0.1 to about 0.4, and typically from about 0.2 to about 0.3 weight percent of the PET, whereas a moisture content of less than about 0.005 and preferably of about 0.001 to 0.0025 percent is required for use in blow molding to prevent hydrolytic degradation.

The crystallization step may be carried out in any apparatus in which the PET may be agitated and exposed to the temperatures described above for the time period described above. Such an apparatus should also provide for some gas flow to carry away volatile material such as moisture and volatile organics which may be contained in the PET. The gas which is used to remove these volatile materials may be air, or any inert gas such as nitrogen, carbon dioxide, helium or neon. Air is a preferred gas in view of economic considerations.

A preferred crystallizer for carrying out this crystallization step comprises a horizontal cylindrical vessel which is jacketed and contains a rotating central shaft or drum and paddles which are attached to that central shaft or drum, as illustrated in U.S. Pat. No. 4,223,128. The paddles are rotated at a rate of generally from about 50 to about 500, typically from about 100 to about 400, and preferably from about 150 to about 300 revolutions per minute. The paddles extend almost to the inside diameter of the cylinder with a clearance which is less than the minimum chip dimension. The jacket of the crystallizer is heated to the temperature at which the crystallization step is carried out. The angle of the paddles is adjusted so that the PET is in the crystallizer for the desired residence time.

A preferred crystallizer for use in the instant process is a Solidaire crystallizer. Other crystallizers which may be used include the Thermascrew and the Holoflite crystallizer. These Thermascrew and Holoflite crystallizers have helical flights on a shaft which rotates at less than 150 rotations per minute.

The second step of the prior art process of U.S. Pat. No. 4,223,128 comprises the stabilization or solid state polymerization of the crystallized PET by heating it to a temperature of from about 180° C. to about 220° C., and preferably from about 190° C. to about 210° C., for generally from about 2 to about 20, and preferably from about 6 to about 12, hours. The present invention is directed to the elimination of this separate step.

The product resulting from this prior art stabilization step has an acetaldehyde content of generally less than about 2.5, typically less than about 2.0, and preferably less than about 1.5 parts of acetaldehyde per million parts of PET, and a GRA of generally less than about 3.0, typically from about 2 to about 3, and preferably from about 2.2 to about 2.6 parts of acetaldehyde per million parts of PET per minute.

The intrinsic viscosity of this prior art product is generally from about 0.50 to about 0.95, typically from about 0.65 to about 0.85, and preferably from about 0.70 to about 0.80, deciliters per gram based upon calculations made from measurements on an 8 percent solution in o-chlorophenol at 25° C.

The prior art process of U.S. Pat. No. 4,223,128 is described as employing a crystallizer and a separate stabilizer, although the patent states that it is possible to carry out the process in a single apparatus which provides means for agitating the PET to prevent agglomeration or sintering and means for providing the low dew point air at the proper air to chip ratio, temperature and vapor velocity.

In contrast to such prior art processes comprising a stabilization or solid state polymerization step as part of the PET chip manufacture, it has now been discovered that a PET chip prepared by a low mole ratio, low temperature process as described above, with sufficient antimony catalyst present, requires only a light crystallization (and, optionally, brief drying at relatively low temperatures) before delivery to the molding facility for use in blow molding after further drying. At this point, the PET chip should have a residual acetaldehyde level of less than about 25, preferably less than about 20, or most preferably, less than about 15, ppm, and an intrinsic viscosity of at least about 0.65, preferably at least about 0.7 deciliters/gram.

At the molding facility, the PET chip is subjected to steps of pre-drying and drying similar to those customary with PET chip produced by prior art processes such as, e.g., that of U.S. Pat. No. 4,223,128, during which suitable increases in intrinsic viscosity and decreases in acetaldehyde content and the generation rate of acetaldehyde can be attained The pre-dry step is conducted at a temperature below about 170° C., preferably in the range of from about 145° C. to about 165° C., using air with a dew point below about −25° C., preferably below about −40° C., flowing at a velocity of about 1 to 2 ft/sec, until the acetaldehyde content has decreased to a desired level, typically less than about 10 ppm. Generally, a time in the range of from about 1 to about 3 hours should be sufficient to produce pre-dried PET chip with a satisfactory acetaldehyde content.

Following the pre-drying step, the PET chip is dried in a drier at a higher temperature using similar air flow conditions, generally in the range of from about 180° C. to 225° C., preferably about 190° C. to about 210° C., for a time sufficient to complete the drying process and meet specific requirements for molding the bottles from parisons of the polymer (e.g., intrinsic viscosity, RAC and GRA). Generally, a drying time in the range of from about 2 to about 5 hours will be sufficient.

These conditions are similar to, or less severe than, conventional drying conditions (e.g., about 2 to 6 hours at temperatures of about 150° to 190° C. using low dew point air flowing at about 1-2 ft/sec). For example, it is reported by Kadykowski in "How to Dry the TP Polyesters", *Plastics Technology*, November 1977, pp. 103–106 that laboratory tests have shown that PET resins can generally be dried for injection molding at 350° F. (177° C.) with 3-4 hours in the drying hopper, but to reduce high acetaldehyde levels to an acceptable level can require 8-10 hours drying time at that temperature. In some cases, the drying process is divided into pre-drying and drying steps.

Thus, the process of the present invention saves a significant amount of time and energy (which can amount to a cost difference of about 6-10 cents per pound of polymer chip) which would be required for a solid state polymerization or stabilization process, as well as eliminating the capital investment required at the production facility for suitable stabilization vessels. The PET chip thus produced can be shipped or used directly in a molding facility, where it is subjected to essentially normal pre-drying and drying steps in the usual installed driers preparatory to melting and molding.

The PET produced by the present invention may be used to produce containers such as carbonated beverage bottles because of the small residual content of acetaldehyde and the low GRA of this PET. One who molds such bottles is given a greater latitude with respect to the temperature and time conditions under which the bottles are formed than if the bottles had a larger GRA, for example. For example, since the GRA of this PET is so low after the pellets have been pre-dried and dried by the molder, one who molds a bottle from the pellets thus obtained would be able to use higher temperatures and/or longer residence times in the injection molding machine than would have been possible had the GRA of the PET not been so low, and still provide a bottle which is useful for containing a carbonated beverage. Alternatively, one who molds a bottle under optimum temperature and time conditions from PET having a low GRA could provide a bottle which has superior characteristics because of this low GRA.

Generally speaking, molders of beverage bottles require PET with RAC less than about 3, preferably in the range of about 1 to about 2 ppm, GRA less than about 4, preferably in the range of from about 3 to about 3.5 ppm/min.; and IV of at least about 0.68, preferably in the range of from about 0.7 to about 0.74 dl/g.

Apart from carbonated beverage bottles, PET having very low GRA is useful for bottles for white liquors, white wine and water, and is particularly useful for making containers for cheese, since cheese is very sensitive to the presence of acetaldehyde. Also, PET having low GRA values is of great value in the manufacture of small PET bottles, their ratio of surface area to volume being larger than it is with larger bottles. Small bottles having a large surface area to volume ratio would more easily transfer acetaldehyde to their contents than would a larger bottle.

The PET produced by the process of the invention may be molded into containers of various types. The PET may be molded by so-called reheat blow molding, injection blow molding, and/or extrusion blow molding. If extrusion blow molding is desired, it is generally important to include with the PET minor amounts of the modifying or chain branching agents described hereinabove in order to sufficiently increase the melt strength of the PET.

The PET polymer may be molded by melting the PET, forming it into a desired preform shape, cooling the molten preform, reheating the preform above its glass transition temperature, and then blow molding into the desired container shape.

The PET may also be extruded into sheets and cooled. Containers may be formed from these sheets.

The PET may also be directly injection molded into a finished solid article by melting the PET, injecting it into a mold, and cooling the PET to room temperature.

The following Examples are given as specific illustrations of the claimed invention. It should be understood however, that the invention is not limited to the specific details set forth in these Examples. All parts and percentages in the Examples as well as in the remainder of the specification are by weight unless otherwise specified.

EXAMPLE I (CALCULATED)

Calculations were performed based upon a computer model of the behavior of PET resin when heated in an industrial-type air drier of the type commonly used by PET molders.

For a period of four hours in the drier at 200° C., the intrinsic viscosity (IV) was predicted to increase by 0.05 units (dl/g), but no change in the generation rate of acetaldehyde (GRA) was predicted in this time frame.

Predicted percentages of acetaldehyde remaining in the resin after four hours in the drier at various temperatures are shown in Table I.

TABLE I

| Temperature (°C.) | Acetaldehyde Remaining, % |
|---|---|
| 170 | 27 |
| 185 | 10 |
| 200 | 2.5 |

Predicted percentages of acetaldehyde remaining in PET of various chip sizes after four hours in the drier at 190° C. are shown in Table II.

TABLE II

| Chip Volume (mm$^3$) | Acetaldehyde Remaining, ppm |
|---|---|
| 2.5 | 6 |
| 2.75 | 8 |
| 3.0 | 11 |

Since the proportion of acetaldehyde remaining, i.e., residual acetaldehyde, is at least partially dependent upon diffusion of this impurity through the chip, the computer model predicts that smaller chips will result in lower proportions of acetaldehyde remaining after a standard time period, and therefore the size of the chip to be used must be considered in designing a production process to decrease acetaldehyde and GRA while increasing intrinsic viscosity (IV).

EXAMPLE II

A series of tests were conducted to confirm the computer predictions of Example I, using a PET resin produced by direct esterification with a relatively low (1.2) mole ratio of glycol to acid, 370 ppm antimony catalyst, and 125 ppm phosphorus added as polyphosphoric acid, the resin having an IV of 0.655 dl/g and chip volume of 2.7 mm$^3$. The experiments involved tray crystallizing the amorphous resin in a forced air, desiccant convection oven, pre-drying for one hour in a 1200 pound commercial Whitlock drier, a typical (circa 1978) desiccant bed recirculating drying system such as shown in FIGS. 2 and 4 of Kadykowski, "How to Dry the TP Polyesters," supra, using low dew point air, followed by drying for varying periods of time at a higher temperature. Air velocity was generally about 1–2 ft/sec. Data illustrating the evaluation of the resin properties as a function of time for three separate trials using the same resin are shown in Tables III and IV.

TABLE III

| Test Point | RAC[1] | % RED[2] | GRA[3] | IV[4] |
|---|---|---|---|---|
| 1 Resin As Received | 39 | — | 3.9 | 0.65 |
| 2 Tray Crystallized 1 hr. at 121° C. | 62 | — | 4.1 | 0.65 |
| 3 Predried in Whitlock 1 hr. at 149° C. | 68 | — | 4.2 | 0.65 |

TABLE III-continued

| Test Point | RAC[1] | % RED[2] | GRA[3] | IV[4] |
|---|---|---|---|---|
| 4 Dried 3 hrs. at 185° C.[5] | 16 | 77 | 3.4 | 0.65 |

[1]Residual acetaldehyde, ppm, tested by the standard GC solid method described above.
[2]Percentage reduction in RAC from highest value to lowest.
[3]Generation rate of acetaldehyde, ppm/min, tested by the standard GRA GC test described in the publication above.
[4]Intrinsic viscosity, dl/g, calculated from measurements made on an 8 weight percent solution in o-chlorophenol at 25° C.
[5]Air with −18° F. dew point used, sample taken from side port at bottom of drier. All temperatures are drier temperature settings.

TABLE IV

| Test Point | RAC I[1] | % RED[2] | GRA[2] | IV[2] | RAC II[1] | % RED II[2] |
|---|---|---|---|---|---|---|
| 1 Resin as Rec'd | 23 | | 5.0 | .63 | 50 | |
| 2 Tray Crystallized 1 hr. at 135° C. | 39 | | 5.6 | .64 | 47 | |
| 3 Predried in Whitlock 1 hr. at 177° C.[3,4] | 32 | | 5.4 | 0.64 | 28 | |
| 4 1 hour in Whitlock at 196° C.[4] | 5.5 | 86 | 4.3 | .64 | 9 | 82 |
| 5 2 hours in Whitlock at 196° C.[4] | 2.8 | 93 | 4.0 | .65 | 4 | 92 |
| 6 3 hours in Whitlock at 196° C.[4] | 2.1 | 95 | 3.3 | .66 | 3 | 94 |
| 7 3½ hrs. in Whitlock at 196° C.[4/5] | 3.3 | 92 | 3.9 | .64 | 5 | 90 |

[1]Residual acetaldehyde, tested by same method as in Table III. RAC II results are for same batch of material treated and tested using the same test sequence, at different laboratory.
[2]GRA, IV and percent reduction defined and tested as in Table III. % RED II results are for same material and test sequence at different laboratory.
[3]Sample taken from side port at bottom of Whitlock drier.
[4]Air with −25° F. dew point used. All temperatures are drier temperature settings.
[5]Resin dropped into drum, with sample taken from top of drum.

The best results were obtained at Test Point 6 of Table IV, where RAC and GRA were at minimums and IV had increased by 0.03 units. The higher temperatures employed in the tests of Table IV appear to have been beneficial. Although the initial values of RAC II are higher than RAC I, they soon become comparable, and the proportions of reduction after drying are very similar. Comparing these data with the computer-modelled predictions, it appeared that acetaldehyde was removed faster than predicted in the initial stages of the test.

EXAMPLE III

Two more drying tests were conducted, using a longer pre-dry time (2 hours) at a lower temperature (157° C.). Since the supply of test resin was exhausted, a substitute was used, having a similar high antimony catalyst level and chip size but a yellower color. This starting material had an IV of 0.65, a RAC of about 25–30 ppm and a GRA of about 6 ppm/min., thus the RAC was somewhat lower and the GRA somewhat higher than the previously-used resin. The resin chip was tray crystallized in an oven to minimize sintering in the drier. After a two hour pre-drying period in the Whitlock drier, the temperature was raised to the drying temperature and maintained for 4.5 hours. Results for tests at drying temperatures of 196° C. and 207° C. are presented in Tables V and VI.

TABLE V

| Test Point | RAC[1] | % RED[1] | GRA[1] | IV[1] |
|---|---|---|---|---|
| Initial chip value | 24 | — | 6.0 | 0.65 |
| Crystallized, 1.5 hrs. at 140° C. | 23 | 4 | 6.2 | — |
| Predrying, 157° C. Setting | | | | |
| 1 hour | 9.4 | 61 | 5.6 | 0.65 |
| 2 hours | 8.0 | 75 | 5.9 | 0.64 |
| Drying, 196° C. Setting[2] | | | | |
| 1 hour | 4.1 | 83 | 5.1 | 0.64 |
| 2 hours | 2.4 | 90 | 4.6 | 0.65 |
| 3 hours | 1.8 | 93 | 3.8 | 0.67 |
| 4 hours | 1.4 | 94 | 3.8 | 0.68 |
| 4.5 hours | 0.9 | 96 | 3.5 | 0.69 |

[1]RAC, % RED, GRA, and IV as defined in footnotes for Table III.
[2]Actual temperature average 200° C., range 188° C.–212° C.

TABLE VI

| Test Point | RAC[1] | % RED[1] | GRA[1] | IV[1] |
|---|---|---|---|---|
| Initial chip value | 29 | — | 5.5 | 0.65 |
| Crystallized, 1.75 hrs. at 140° C. | 21 | 28 | 5.8 | 0.64 |
| Predrying, 157° C. Setting | | | | |
| 1 hour | 12 | 59 | 6.9 | 0.64 |
| 2 hours | 9.3 | 68 | 5.5 | 0.64 |
| Drying, 207° C. Setting[2] | | | | |
| 1 hour | 4.2 | 86 | 5.7 | 0.65 |
| 2 hours | 2.4 | 92 | 4.0 | 0.69 |
| 3 hours | 1.6 | 94 | 3.2 | 0.71 |
| 4 hours | 1.6 | 94 | 3.2 | 0.72 |
| 4.5 hours[3] | 1.0 | 97 | 3.0 | 0.72 |

[1]RAC, % RED, GRA, and IV as defined in footnotes for Table III.
[2]Actual temperature average 210° C., range 200° C.–220° C.
[3]Some sintering occurred at this point.

These data show that even with a less than ideal starting material, after crystallizing and pre-drying for two hours, drying the polymer for three to four hours under conditions similar to those in a molding facility can produce a PET chip suitable for molding beverage bottles. For instance, after 4 hours at the higher drying temperature (Table IV), the values of RAC, GRA and IV compare favorably to the specifications for "PET-PAC 2113", a commercial polyethylene terephthalate resin which is acceptable for the molding of cola bottles. (The seller's specifications for this commercial resin include RAC of 2.5 ppm maximum, and an IV of 0.74±0.02 dl/g, and GRA was generally limited to 3.5 ppm/min.) At the lower drying temperature of Table V after 4–4.5 hours, the values of RAC and GRA were acceptable, but the IV relatively low at 0.69. However, a resin with these properties could be used in some molding processes, or a suitable IV could be attained by increasing the IV of the starting material.

These data demonstrate that a suitable PET chip, preferably one produced by a low mole ratio (glycol/acid) direct esterification process having a sufficient quantity of an antimony catalyst present, can be processed directly by a molding facility without the necessity of a costly, time-consuming solid state polymerization or stabilization step at the production stage. Using the usual type of driers found in a molding facility, after pre-drying and drying steps which are substantially equivalent (or only slightly more severe) than the normal pre-molding steps, such resins can meet the severe requirements for the molding of beverage bottles, including those for cola-type beverages. In a typical plant, the resin can be pre-dried in a central drier, with the final 3-4 hours of drying conducted in individual driers on each molding machine. The chip can be lightly crystallized at either the production or the molding facility.

EXAMPLE IV

Further tests were conducted to confirm that the resin as processed in the runs of Tables V and VI was suitable for cola-type beverage applications, and to prepare and test preforms and bottles. The resin used was the same as in Example III, containing 320 ppm Sb. An intermediate temperature setting (199° C.) was used to reduce sintering. The resulting data are presented in Table VII. Upon completion of the drying step, the resin was molded into preforms at 277° C. for testing.

TABLE VII

| Test Point | RAC[1] | % RED[1] | GRA[1] | IV[1] |
|---|---|---|---|---|
| Initial chip value | 30 | — | 5.3 | 0.65 |
| Crystallized, 1.5 hr. at 149° C. | 22 | 27 | 5.4 | 0.64 |
| Predrying, 157° C. Setting | | | | |
| 1 hour | 12 | 60 | 6.5 | 0.67 |
| 2 hours | 9.4 | 69 | 5.9 | 0.65 |
| Drying, 199° C. Setting[2] | | | | |
| 1 hour | 3.2 | 89 | 5.2 | 0.70 |
| 2 hours | 2.1 | 93 | 4.5 | 0.68 |
| 3 hours | 1.4 | 95 | 3.8 | 0.70 |
| 4 hours | 1.0 | 97 | 3.6 | 0.69 |
| Molding at 277° C. | | | | |

[1]RAC, % RED, GRA, and IV as defined in footnotes to Table III.
[2]Actual temperature range 192° C.-204° C.

After 3-4 hours of drying, the resin had RAC and GRA values essentially suitable for molding beverage containers, with IV values of about 0.70.

Comparing the results of Examples II, III and IV, it appears that the higher drying temperatures produce the highest IV and the lowest GRA values, with the lowest drying temperature producing the lowest IV and highest GRA. However, the values for RAC did not follow this trend, probably since during the reduction in GRA, additional RAC is produced.

Upon completion of this drying study, the resin of Example IV was molded at 277° C. into preforms on a Cincinnati-Milacron 8 cavity hot runner preform injection molding machine. Bottles were blown from these preforms and tested for headspace acetaldehyde by the standard bottle headspace test described by Kirshenbaum et al. above. The resulting values, 1.4-1.9 mg/l were below the cola bottlers' specifications of 3.0 mg/l and thus the bottles should easily pass the cola "taste tests."

Several tests of physical properties were also conducted on bottles blown from the preforms of Table VII. Top-load tests conducted on an Instron tester produced results ranging from 79 to 93 pounds (average 87 lbs), which are totally acceptable for beverage bottles. Dimensional stability studies using the Coca-Cola "pack test" procedures showed negligible creep differences between bottles molded from the preforms of Table VII and controls molded from commercial resins. Similarly, accelerated aging studies at 43° C. over a nine week period showed negligible differences in CO$_2$ pressure loss data between these example bottles and the controls.

EXAMPLE V

Additional tests were conducted to further simulate field conditions. The hopper of the Whitlock drier was loaded with 500-600 pounds of resin, and after four hours of drying, typical molding studies were conducted. The resin data presented in Tables VIII and IX are very comparable to those of Table VII. Bottle headspace acetaldehyde and top load tests were also acceptable.

TABLE VIII

| Test Point | RAC[1] | GRA[1] | IV[1] |
|---|---|---|---|
| Initial chip[2] value | 29 | 6.3 | 0.64 |
| Crystallized, 1 hr. at 138° C. | 19 | 6.3 | 0.65 |
| Predry, 157° C. Setting | | | |
| 1 hour | 7.7 | 5.4 | 0.64 |
| 2 hours | 5.7 | 5.4 | 0.64 |
| Drying, 199° C. Setting | | | |
| 1 hour | 3.0 | 4.9 | 0.65 |
| 2 hours | 1.7 | 5.7 | 0.66 |
| 3 hours | 1.1 | 4.5 | 0.68 |
| 4 hours[3] | 1.0 | 4.7 | 0.69 |
| 5 hours | 1.1 | 5.3 | 0.69 |
| 6 hours | 0.84 | 4.7 | 0.68 |

[1]RAC, GRA, and IV as defined in footnotes to Table III.
[2]Chip contained 335 ppm Sb, 37 ppm P.
[3]After 4 hours, began molding.

Testing of bottles produced headspace acetaldehyde values of 1.9-2.2 mg/l.

TABLE IX

| Test Point | RAC[1] | GRA[1] | IV[1] |
|---|---|---|---|
| Initial chip value[2] | 27 | 6.3 | 0.64 |
| Crystallized, 1 hr. at 149° C. | 18 | 5.9 | 0.65 |
| Predry, 157° C. Setting | | | |
| 1 hour | 6.5 | 6.7 | 0.64 |
| 2 hours | 4.6 | 6.7 | 0.64 |
| Drying, 199° C. Setting | | | |
| 1 hour | 3.0 | 4.5 | 0.65 |
| 2 hours | 2.1 | 4.4 | 0.67 |
| 3 hours | 1.5 | 2.9 | 0.70 |
| 4 hours[3] | 2.1 | 3.4 | 0.69 |
| 5 hours | 0.93 | 3.2 | 0.68 |
| 6 hours | 1.4 | 3.6 | 0.69 |
| 7 hours | 1.4 | 3.9 | 0.69 |

[1]RAC, GRA, and IV as defined in footnotess to Table III.
[2]Chip contained 312 ppm Sb, 35 ppm P.
[3]After 4 hours, began molding.

Testing of bottles produced headspace acetaldehyde values of 2.3-2.9 mg/l.

In the tests of Tables VIII and IX, the clear point (an indication of optimum molding conditions) was 520° F., which is 10° F. lower (i.e., better) than that for typical PET produced by processes including solid state polymerization. On the other hand, although the preforms were clear, they seemed softer than usual, and there were some molding problems due to low viscosity and some tendency for the preforms to stick to the mold, although they could still be molded satisfactorily.

Although the invention has been described with preferred embodiments, it is to be understood that variations and modifications may be employed without departing from the concept of the invention as defined in the following claims.

We claim:
1. An improved process for producing polyethylene terephthalate chip having levels of acetaldehyde con- tent and acetaldehyde generation rate and intrinsic viscosity suitable for molding, said process comprising the steps of:
  (a) introducing ethylene glycol and terephthalic acid to a reactor in a ratio of from about 1.05 to about 1.35 moles ethylene glycol per mole terephthalic acid and an antimony catalyst in a concentration in the range of from about 325 to about 600 parts antimony per million parts by weight of the product polymer, and heating the resulting mixture at a temperature in the range of from about 240° to about 260° C. and a pressure in the range of from about 1 to about 5 atmospheres until said acid is at least about 95 percent esterified to form an esterified monomer mixture;
  (b) melt polymerizing the antimony-containing esterified monomer mixture of step (a) in at least two stages at progressively higher temperatures in the range of from about 270° to about 285° C. and at a reduced pressure, until it attains an intrinsic viscosity of at least about 0.64 dl/g;
  (c) extruding the melt of step (b) into a water bath for quenching, then pelletizing the quenched polymer so that the average individual volume chip is in the range of from about 2.3 to about 3.5 mm$^3$; and
  (d) crystallizing the polymer pellets by heating in air or an inert atmosphere with agitation at a temperature in the range of about 110° to about 160° C. for a time effective to produce a degree of crystallinity in said polymer in the range of from about 10 percent to less than about 30 percent.

2. A process in accordance with claim 1 wherein the ratio of reactants in step (a) is in the range of from about 1.15 to about 1.25 moles ethylene glycol per mole terephthalic acid.

3. A process in accordance with claim 1 wherein said antimony catalyst is present in step (a) in an amount in the range of from about 350 to about 450 parts antimony per million parts by weight of said product polymer.

4. A process in accordance with claim 1 wherein said mixture of step (a) is heated to a temperature in the range of from about 245° to about 255° C., and said pressure is maintained in the range of from about 2 to about 4 atmospheres.

5. A process in accordance with claim 1 wherein said polymer pellets are crystallized in step (d) to produce a degree of crystallinity in the range of about 15 to about 25 percent.

6. A process in accordance with claim 1 wherein the crystallized polymer pellets have levels of residual acetaldehyde of less than about 25 parts per million and an intrinsic viscosity of at least about 0.65 deciliters per gram calculated from measurements made on an 8 weight percent solution in o-chlorophenol at 25° C.

7. A process in accordance with claim 1 wherein said polymer pellets have a residual acetaldehyde content in the range of from about 15 to about 20 parts per million and an intrinsic viscosity in the range of from about 0.65 to about 0.7 deciliters per gram.

8. A process in accordance with claim 1 wherein said antimony catalyst is present as elemental antimony or an antimony compound selected from the group consisting of antimony trioxide, antimony oxalate, antimony glucoxide, antimony butoxide, and acetyl antimony dibutoxide.

9. Crystallized pellets of polyethylene terephthalate prepared in accordance with the process of claim 1.

10. A process wherein crystallized polyethylene terephthalate chip prepared in accordance with claim 1 is made ready for molding at a molding facility by subjecting the chip to a pre-drying step for a time in the range of from about 1 to about 3 hours at a temperature in the range of from about 145° C. about 165° C. using air having a dew point below about −25° C. flowing at a velocity of about 1 to 2 ft/sec., and then a drying step at a temperature in the range of from about 190° to about 210° C. for a period of time in the range of from about 2 to about 5 hours.

11. A process in accordance with claim 10 wherein the resulting dried polyethylene terephthalate chip has an acetaldehyde level of less than about 3 parts per million and a rate of generation of acetaldehyde of less than about 4 parts per million per minute, and an intrinsic viscosity of at least about 0.68 deciliters per gram as calculated from measurements made on an 8 weight percent solution in o-chlorophenol at 25° C.

12. A process for molding a polyethylene terephthalate container from polyethylene terephthalate chip prepared in accordance with the process of claim 10.

13. Articles molded in accordance with the process of claim 12.

14. An improved process for producing polyethylene terephthalate suitable for molding, comprising the steps of:
  (a) esterifying ethylene glycol by heating it in admixture with terephthalic acid and at least about 325 parts antimony catalyst per million parts of the polymer product in a ratio of about 1.05 to about 1.35 moles of said glycol per mole of said acid at a temperature in the range of from about 240° to about 260° C. and a pressure in the range of from about 1 to 5 atmospheres until said acid is at least about 95 percent esterified to form an esterified monomer mixture;
  (b) melt polymerizing the antimony-containing monomer mixture of step (a) at a temperature in the range of from 270° to 285° C. and at a reduced pressure until it attains an intrinsic viscosity of at least about 0.64;
  (c) extruding, quenching and pelletizing the melt product of (c) to form chip of an average volume in the range of from about 2.3 to about 3.5 mm$^3$;
  (d) crystallizing the polymer pellets of (c) by heating with agitation in air or an inert atmosphere at a temperature in the range of from about 110° to about 160° C. to produce a degree of crystallinity within the range of from about 10 to about 25 percent;
  (e) transporting the pellets to a molding facility;
  (f) pre-drying said crystallized polymer pellets in the molding facility at a temperature in the range of from about 145° to about 165° C. for a time in the range of about 1 to about 3 hours using air having a dew point below about −25° C. flowing at a velocity of about 1 to 2 ft/sec.; and
  (g) thereafter drying said polymer pellets in a drier at a temperature in the range of about 180° to about 225° C. for a time in the range of about 2 to about 5 hours using air having a dew point below about −40° C. flowing at a velocity of about 1 to 2 ft/sec., thereby producing a molding resin having a level of residual acetaldehyde less than about 3 parts per million, a generation rate of acetaldehyde less than about 4 parts per million per minute, and an intrinsic viscosity of at least about 0.68 deciliters per gram as calculated from measurements made on an 8 weight percent solution in o-chlorophenol at 25° C.

15. A process for molding polyethylene terephthalate comprising the steps of melting a polymer produced by the process of claim 14, forming it into a desired shape, and cooling the molten polymer.

* * * * *